United States Patent [19]
Cradeur

[11] Patent Number: 5,862,819
[45] Date of Patent: Jan. 26, 1999

[54] MOBILE APPARATUS FOR REMOVING HAZARDOUS GASES FROM ENCLOSED STRUCTURES

[76] Inventor: Robert R. Cradeur, 1098 Goodrich Rd., Sulphur, La. 70663

[21] Appl. No.: 584,891

[22] Filed: Jan. 11, 1996

[51] Int. Cl.[6] ..................................................... B08B 3/04
[52] U.S. Cl. ......................... 134/61; 134/102.1; 134/201
[58] Field of Search ........................ 134/61, 201, 102.1; 55/228, 233, 356, 358, DIG. 29

[56] References Cited

U.S. PATENT DOCUMENTS

| | | |
|---|---|---|
| 1,585,358 | 5/1926 | Arkwright . |
| 3,047,565 | 7/1962 | Braun et al. .......................... 260/239.3 |
| 3,348,825 | 10/1967 | McIlvaine . |
| 3,409,275 | 11/1968 | Miller et al. . |
| 3,640,513 | 2/1972 | Bowie . |
| 3,690,039 | 9/1972 | Salemink . |
| 3,724,173 | 4/1973 | Fry, Sr. .......................................... 47/6 |
| 3,844,746 | 10/1974 | Kutryk . |
| 4,323,377 | 4/1982 | Jolin . |
| 4,374,786 | 2/1983 | McClain . |
| 4,407,678 | 10/1983 | Furness et al. ...................... 134/167 R |
| 4,723,968 | 2/1988 | Schippert et al. . |
| 4,817,653 | 4/1989 | Krajicek et al. ..................... 134/168 R |
| 4,865,488 | 9/1989 | Huston et al. . |
| 4,933,118 | 6/1990 | Meston . |
| 4,945,933 | 8/1990 | Krajicek et al. ..................... 134/167 R |
| 5,091,016 | 2/1992 | Krajicek et al. ........................ 134/22.1 |
| 5,259,931 | 11/1993 | Fox . |

Primary Examiner—Frankie L. Stinson
Attorney, Agent, or Firm—Jenkens & Gilchrist; John R. Kirk, Jr.

[57] ABSTRACT

A scrubbing tower mounted on a mobile frame is movable between a horizontal transport position and a vertical operating position. A means is provided for distributing gas upwardly through the scrubbing tower, and water downwardly through the scrubbing tower, when the tower is in the vertical operating position. The apparatus also includes a blower and a pump mounted on the mobile frame, the blower being connectable with a source of hazardous gases enclosed within a storage vessel, and the pump being connectable with a source of water. The apparatus is especially beneficial in removing water soluble hazardous compounds, such as ethylene dichloride and hydrogen sulfide, from gaseous atmospheres.

12 Claims, 4 Drawing Sheets

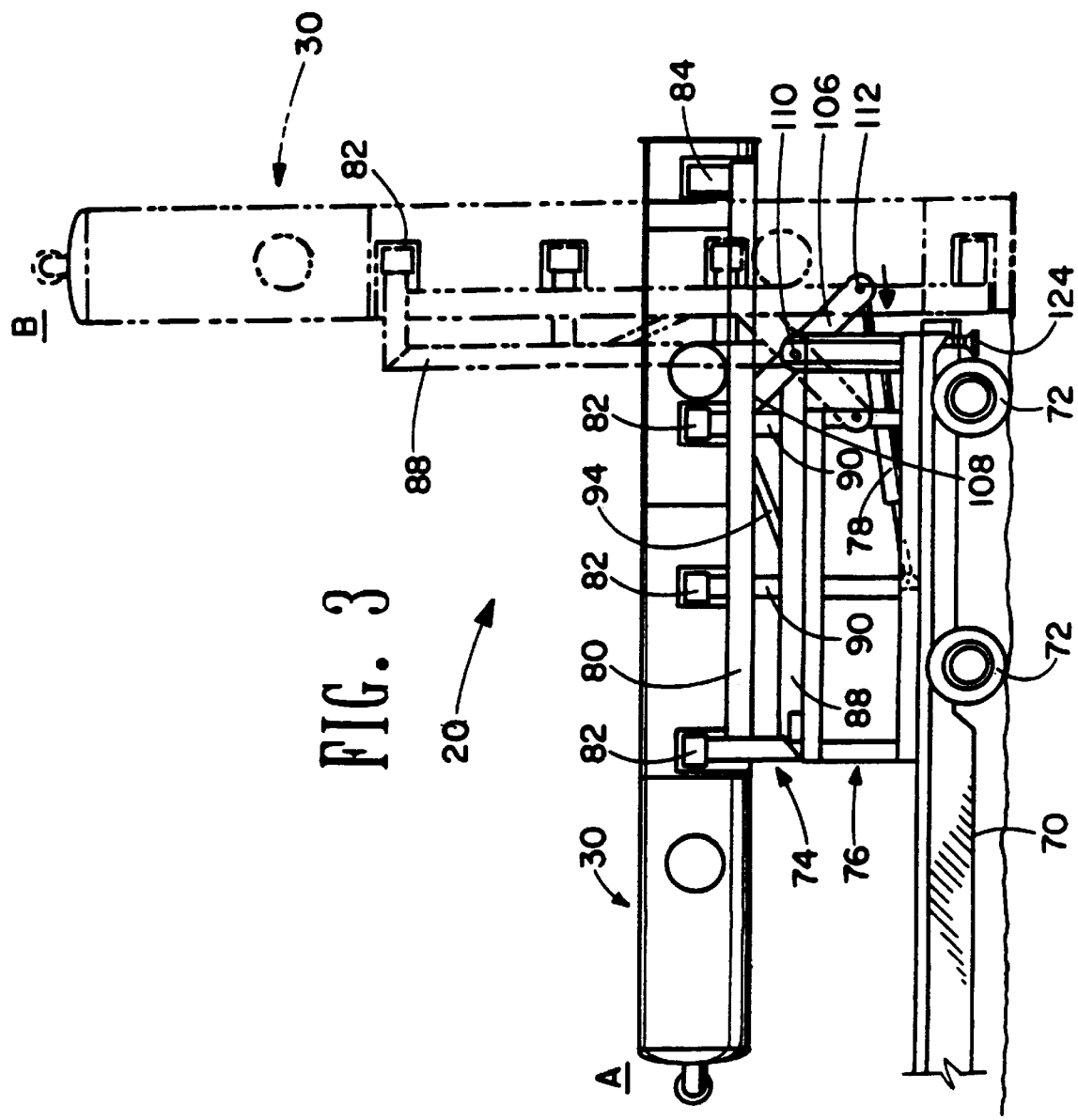

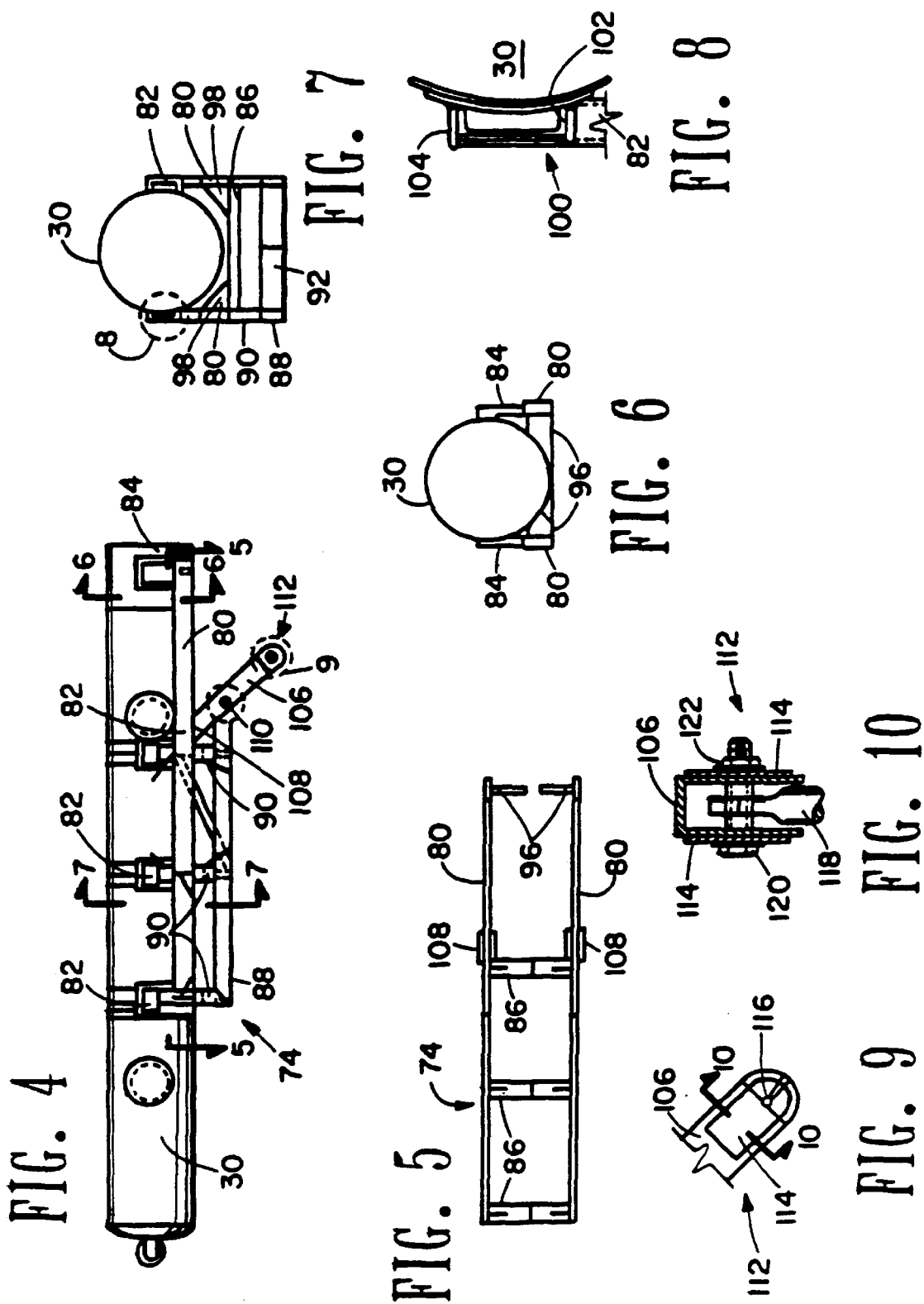

MOBILE APPARATUS FOR REMOVING HAZARDOUS GASES FROM ENCLOSED STRUCTURES

BACKGROUND OF THE INVENTION

1. Technical Field

This invention relates to a mobile apparatus for scrubbing gases, or stripping liquids, containing hazardous materials, and more particularly to such an apparatus for removing hazardous gases such as ethylene dichloride and hydrogen sulfide from enclosed storage tanks or other vessels.

2. Background Art

Petroleum products, particularly crude oil, are stored in tanks, many of which are very large, holding as much as 500,000 barrels of crude oil. Such tanks may exceed 250 feet in diameter. Crude oil stored in these tanks deposit sludges which accumulate on the bottom of the tanks, resulting in operational problems and diminished volumetric capacity. Several methods have been devised to simplify the cleaning of these tanks and the removal of accumulated sludges from the tanks. For example, such methods and equipment are described in U.S. Pat. Nos. 4,945,933, 4,817,653, 5,091,016 and 4,407,678. While each of these patents describes successful means for handling the sludges in various way, another problem has existed with respect to sour crude oil storage that is not addressed by any of the aforementioned art and, yet, creates an extremely hazardous situation for ultimate cleaning of storage tanks, requiring the entry of work people into the tanks.

An environmental concern has also developed in connection with soils contaminated with volatile hazardous gases, such a ethylene dichloride. Often the only solution for containment of the solids contaminated with ethylene dichloride in a benign manner is by using an enclosed storage tank as a holding vessel for such contaminated soils. As the soil lies in the tank, the volatile ethylene dichloride permeates the atmosphere within the tank, creating a dangerous situation of proportions equal to that of the hydrogen sulfide invasion of the contained atmosphere of a hydrocarbon storage tank.

Additionally, the entry of a worker into an atmosphere of ethylene dichloride requires care equal to that of the care required in an atmosphere invaded by hydrogen sulfide. Many attempts have been made to avoid the necessity of entry into such tanks which burdens the worker by the necessity of wearing heavy, hot and cumbersome equipment to the extent that efficiency is lost and dangerous, life threatening work situations occur, particularly in the enclosed tank atmosphere during hot periods, such as summer along the Texas and Louisiana Gulf Coast where many such tanks exist.

Ethylene dichloride poses a particularly troublesome problem since it is water soluble and leaches from surface soil into progressively deeper areas of soil and into lakes and streams and, accordingly, presents a threat to water supplies. Therefore, is must be removed. However, without adequate means of containment the removal and treatment becomes a complicated environmental problem. For example, when stored in closed containers, such as large storage tanks, the vapor pressure of ethylene dichloride increases at elevated temperatures and, in a relatively short time, the entire atmosphere within the storage tank is saturated with the hazardous gas mixture.

Because of continued governmental regulations, such as the Resource Conversion and Recovery Act (RCRA) and the Hazardous and Solid Waste Amendment of 1984 (HSWA), which establish comprehensive "cradle to grave" provisions to regulate hazardous materials, there is an increased need for the efficient removal of volatile compounds from solid materials and enclosed environments.

An effective method for removing hazardous gases from enclosed structures is described in copending application Ser. No. 08/084,619, now U.S. Pat. No. 5,634,962 also assigned to the Assignee of the present invention. The treatment method described in the copending application includes withdrawing hazardous, water soluble gases from a vessel and introducing the gases into a scrubbing zone while expanding the gases. Desirably, the described treatment method is carried out on-site, i.e., in proximity to the storage vessel or tank. However, on-site equipment takes up valuable space in usually already crowded physical plants at which large storage tanks are typically placed. Also, on-site equipment is expensive to construct, maintain and operate if not required or used on a substantially continuous, or at least frequent, basis.

The present invention is directed to overcoming the problems set forth above. It is desirable to have an apparatus for effectively removing undesirable, water soluble compounds from a gas, without requiring the entry of workers into a vessel in which the gas is contained. It is also desirable to have such an apparatus that is mobile, and can be moved from site-to-site, as needed, to remove contaminate materials from the enclosed environment of a storage tank. Furthermore, it is desirable to have a mobile apparatus capable of separating water soluble hazardous materials from a gaseous mixture enclosed within a storage tank, and then recirculating the cleaned gases to the tank to sweep additional hazardous materials from the tank.

SUMMARY OF THE INVENTION

The mobile apparatus of this invention accommodates on-site gas/liquid mass transfer needs by operation as a stripping tower. In accordance with one aspect of the present invention, an apparatus for removing hazardous gases from enclosed structures comprises a scrubbing tower mounted on a mobile frame, a means for moving the scrubbing tower between a horizontal transport position and a vertical operating position, and a means for maintaining the scrubbing at the vertical operating position. The apparatus accomplishes this through a means for distributing gas upwardly through the scrubbing tower, and means for distributing water downwardly through the scrubbing tower, when the scrubbing tower is in the vertical operating position. A blower is preferably mounted on the moveable frame and has a discharge port in fluid communication with the means for distributing gas upwardly through the scrubbing tower, and an inlet port adapted to receive a first conduit that is connectable with an enclosed vessel containing a hazardous gas mixture. A second conduit provides fluid communication between a chamber disposed at an upper end portion of the scrubbing tower and the enclosed vessel containing a hazardous gas mixture. The apparatus also includes first and second pumps, each of which are mounted on the mobile frame. The first pump has an inlet port in fluid communication with a bottom portion of the scrubbing tower. The second pump has an inlet port adapted for connection with a source of water, and a discharge port in fluid communication with the means for distributing water downwardly through the scrubbing tower. It operates as a stripping tower or column by circulating contaminated water over the top and stripping it with a clean gas through the bottom.

BRIEF DESCRIPTION OF THE DRAWINGS

FIG. 3 is a side elevation view of the mobile apparatus of the preferred embodiment of the present invention, showing the scrubbing tower in a horizontal traveling position and, in broken lines, in a vertical operating position;

FIG. 4 is a side view of the scrubbing tower and the cradle which supports the scrubbing tower;

FIG. 5 is a sectional top view of the tower cradle taken along the line 5—5 in FIG. 4;

FIG. 6 is a cross-sectional view of the scrubbing tower and its supporting cradle taken along the line 6—6 in FIG. 4;

FIG. 7 is a cross-sectional view of the scrubbing tower and the supporting cradle taken along the line 7—7 in FIG. 4;

FIG. 8 is an enlarged detailed sectional view of the tower side support structure, taken from the dashed circle 8 in FIG. 7;

FIG. 9 is an enlarged detailed schematic view of the cylinder connection portion of the pivot arm used to lift the scrubbing tower, taken from the dashed circle 9 in FIG. 4; and FIG. 10 is a cross-sectional schematic view of the cylinder connection of the pivot arm taken along the line 10—10 of FIG. 9.

DETAILED DESCRIPTION OF THE INVENTION

To generally describe the use of a mobile mass transfer apparatus 20 embodying the present invention, and the relationship of other units that may be used it will be described in the context of carrying out a scrubbing operation using the mobile scrubbing apparatus 20, the elements generally required to carry out such operations are shown schematically in FIG. 1. The mobile scrubbing apparatus 20, comprising the components enclosed within the area defined by dashed lines in FIG. 1, will be additionally described later in greater detail. Other components, disposed outside the enclosed dashed line area in FIG. 1, are used in cooperation with the mobile scrubbing apparatus 20 for evacuation and treatment of gases from the interior headspace of a vessel, such as a storage tank, which may contain either noxious vapors such as hydrogen sulfide from stored sour crude oil or ethylene dichloride from stored soil.

Figure 1:
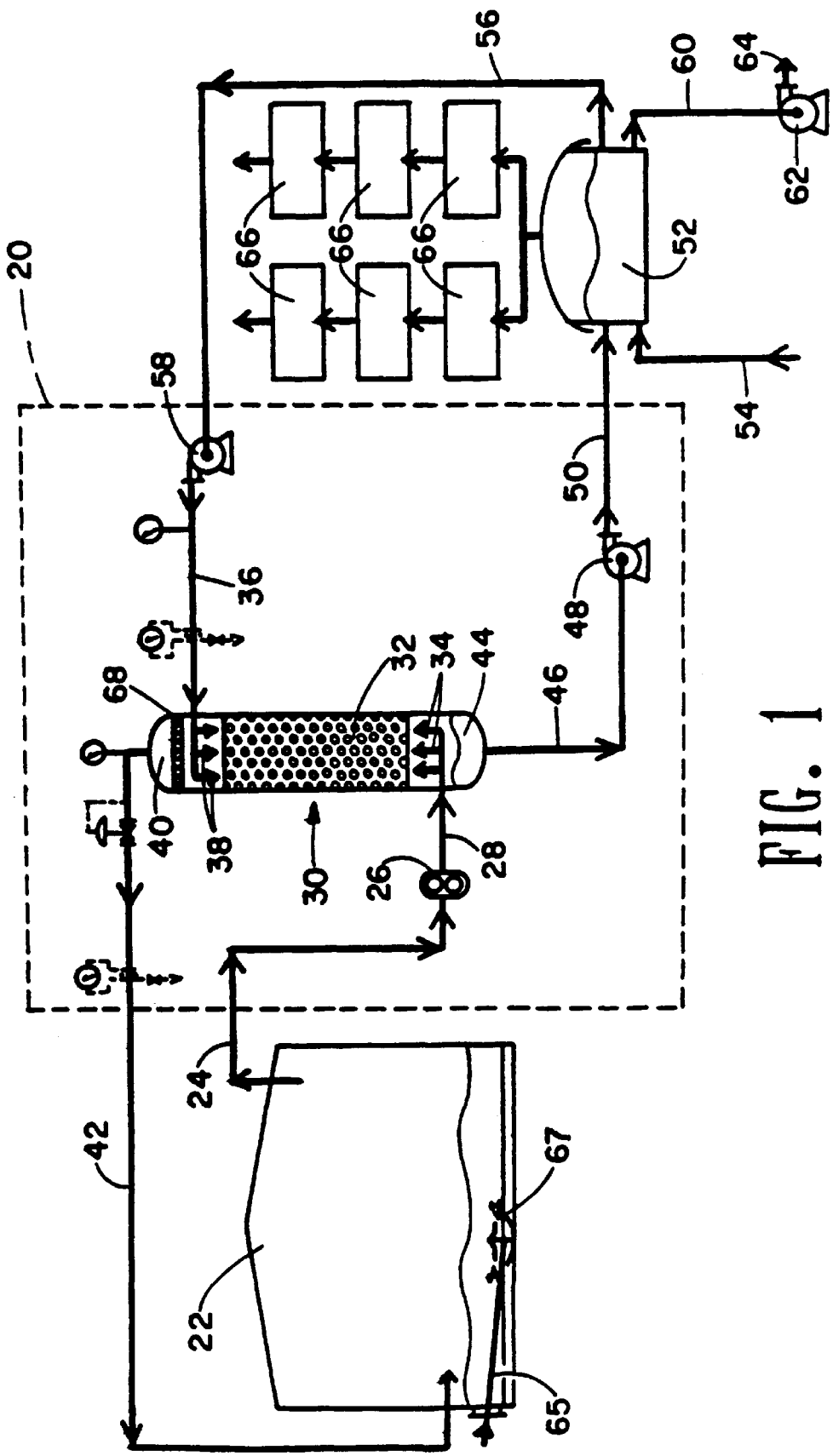
FIG. 1 is a schematic flow diagram showing, within the area defined by broken lines, the principal elements of the mobile apparatus embodying the present invention in which hazardous gases are removed from enclosed structures.

With particular reference to the flow diagram of FIG. 1 showing the method of the aforementioned copending application, the gaseous atmosphere to be treated by the mobile scrubbing apparatus 20 is captive in the headspace of a storage tank 22. If crude oil is stored in the tank 22, the hazardous gas within tank's atmosphere will normally be hydrogen sulfide and/or benzene. When ethylene dichloride contaminated soil is stored in the tank, the hazardous gas is ethylene dichloride. The gas atmosphere enclosed within the storage tank 22 is withdrawn through a first conduit, or line, 24 connected to the inlet port of a blower 26 which draws a suction on the tank 22, thus reducing the interior pressure of the tank to below atmospheric pressure. This negative pressure also maintains a safe environment around the tank 22 because the hazardous gases in the interior are prevented from exiting through the vent of the tank, which could occur if the pressure inside the tank exceeds the pressure outside the tank 22.

In an illustrative embodiment, the blower 26 is a Dresser Industries, Roots Division, Model RGS-JV size 624 driven by a 75 horsepower diesel engine. The blower 26 preferably operates at a variable speed for from about 1100 to about 2100 rpm. Smaller blowers, such as the Model RAIU size 718 blower, are also available and, depending on the desired gas flow rates, also may be used in the present invention. If stripping a hazardous or volatile organic compound from water the inlet of the blower may draw in fresh or ambient air or another gas.

The undesirable vapor, or gases, from the tank 22 passing through the blower 26 are directed through a conduit 28, at a pressure of from about 3 to about 6 psig, to a scrubbing tower 30 where it is introduced into a scrubbing zone 32 through a means for distributing the gas upwardly through the scrubbing tower 30 when the tower 30 is vertically disposed, such as a perforated-pipe distributor, or sparger, 34. The vapors containing the hazardous gas flow upwardly through a packing material disposed within the scrubbing zone 32, whereat the gas contacts, in counter-current flow, water entering the scrubbing tower 30 through a supply line 36 and appropriate distributors 38 to uniformly flood the packing material disposed within the scrubbing zone 32. The distributor 38 may be any such means for distributing water downwardly through the scrubbing tower 30 that is well known to the skilled engineer, such as spray nozzles. The gases entering the scrubbing tower 30 are allowed to expand on entering the scrubbing zone 32, thus causing the gases to cool and thereby increase the solubility of the hazardous compounds carried in the gas stream the gases pass upwardly through the scrubbing zone 32. Ethylene dichloride has a maximum solubility at 25° C. of one part per 128 parts of water, by weight. At lower temperatures, the solubility is greater, resulting in more efficient removal of ethylene dichloride from the gas stream. Thus the comparable flow rates and residence time must be adjusted in order to provide sufficient contact with water to remove the ethylene dichloride. In the operation of this system, the exiting vapors will generally still contain a small amount of ethylene dichloride. However, in practice, it is not necessary to remove all of the ethylene dichloride from the vapor. The flow rate of the water entering the scrubbing tower 30 through the supply line 36 is typically from about 150 to about 300 gallons per minute, and preferably from about 225 to about 275 gpm. The actual flow rate will vary with the design size of the scrubbing tower 30 and the concentration of the vapors entering the scrubbing zone 32.

Contact of the upwardly moving gases containing water soluble hazardous compounds, such as ethylene dichloride or hydrogen sulfide, with water results in removal of a large amount of the hazardous materials from the gas stream. The resultant scrubbed gas collects in a headspace 40 at the upper end of the scrubbing tower 30. The scrubbed gases contain significantly less of the hazardous water soluble compounds present in the gas stream when it is introduced into the bottom of the scrubber 30. From the headspace 40, the gas is recycled to the storage tank 22 through a second conduit, or return line, 42, and the cycle continued until the atmosphere inside of the tank 22 is substantially free of hazardous vapors.

Water circulating downwardly through the scrubbing zone 32 of the scrubbing tower 30 becomes contaminated with the condensed and absorbed hazardous compounds and collects in the lower portion, or bottom, 44 of the scrubbing tower 30. The contaminated water is drawn from the bottom 44 of the scrubbing tower 30 through a drain line 46 by a first pump 48, and delivered by a line 50 to a holding vessel 52 which is, of course, isolated from the atmosphere because of the hazardous compounds dissolved in the water. In the holding tank 52, a stream of feed water enters through a supply line 54 to dilute the contaminated water entering through line 50. The dilution reduces the concentration of hazardous compounds in solution, enabling the water to absorb additional soluble hazardous compounds from the gas stream when recirculated through the scrubbing tower 30. Also, the water entering through the supply line 54 may be used to adjust the temperature of the water being recirculated, thereby further enabling the water stream to absorb greater amounts of ethylene dichloride and hydrogen sulfide.

A recycle stream, diluted to approximately ¼ to ⅔ the contaminate concentration of the water stream entering the holding tank 52 through line 50, is withdrawn from the holding tank 52 through a recirculation line 56 by a second pump 58, whereupon the recirculated water is directed through the aforementioned water supply line 36 to the distributors 38 disposed in the upper end of the scrubbing tower 30. The balance of the diluted water is removed from the holding tank 52 through a line 60 by a third pump 62 which delivers the withdrawn diluted water to carbon filter cartridges, not shown, where the hazardous compounds, whether ethylene dichloride or hydrogen sulfide, are absorbed from the water by the carbon filters.

The holding tank 52 is desirably protected against the escape of vapors by the installation of one or more carbon filters 66 on the tank vent to absorb any hazardous gases which may escape through the vent. The carbon filters 66 are preferably arranged in both series and parallel order to prevent any accidental contamination of the atmosphere.

Figure 2:
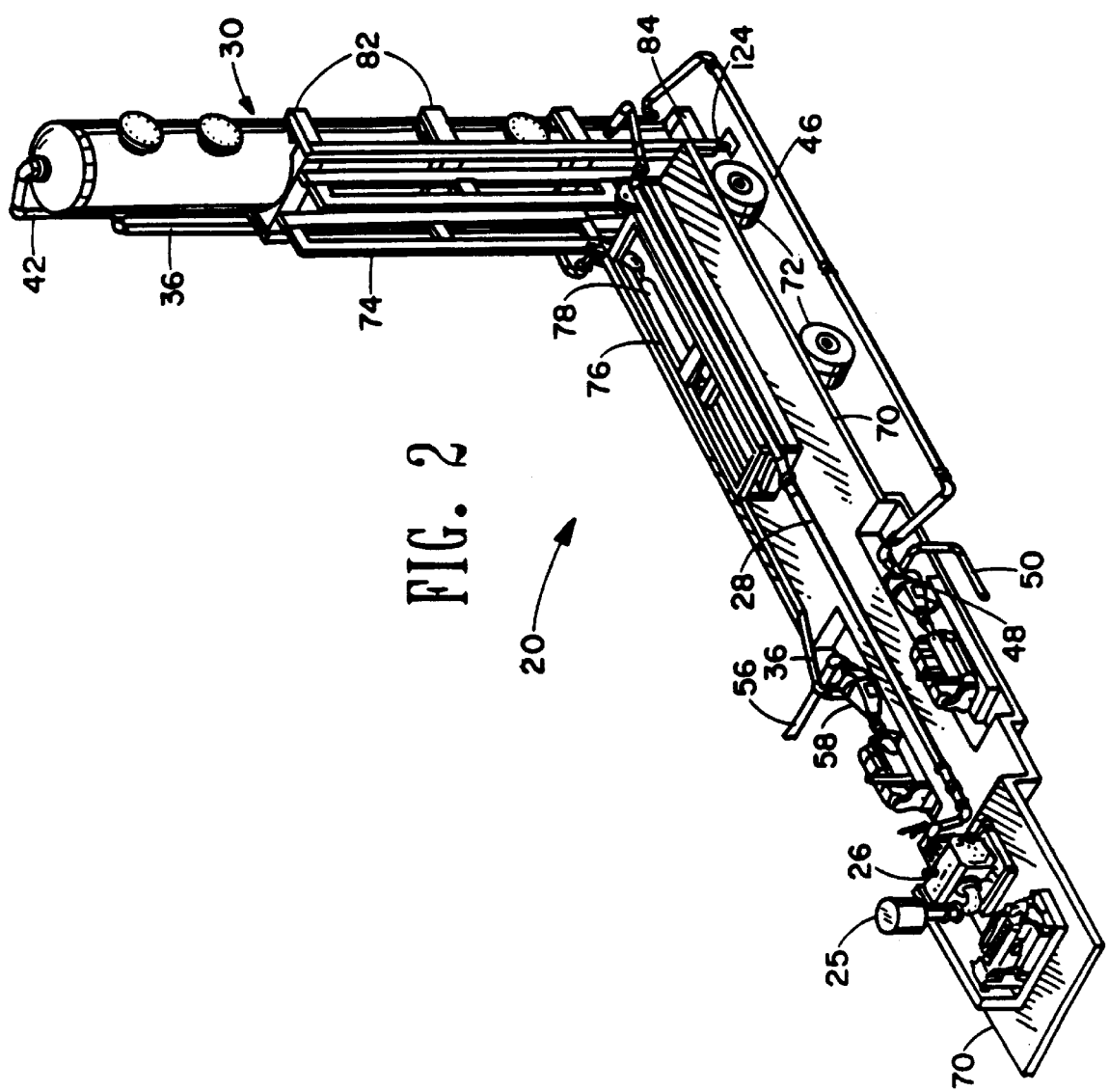
FIG. 2 is a perspective view of a mobile apparatus, defined within the area enclosed by broken lines in FIG. 1, representing the preferred embodiment of the present invention.

In FIG. 2 the blower 26, first pump 48 and second pump 58 are shown in their preferred embodiments as mounted on the mobile frame shown as a flatbed trailer 70 it being understood, however, that one or more of these pieces may be separately mounted and transported to the area wherein the scrubbing apparatus of this invention is used. The determination of which, if any of this equipment is mounted on the mobile frame, is an option but the preferred embodiment shown on FIG. 2 carries the entire apparatus as a distinct unit. Desirably, a removable suction filter 25 is located on the inlet side of the blower 26. The suction filter 25 is used during operations as a stripping tower but is not generally required during closed loop circulation, and therefore may be removed during such operation and the inlet line 24 coupled directly to the inlet port of the blower 26.

In the case where the storage tank 22 is an oil storage tank, the typical sludge buildup in the bottom of the tank 22 can be agitated by ways known to those skilled in the art, for instance as described in U.S. Pat. No. 4,407,678 which is incorporated herein by reference for all purposes, causing the sludge to be mixed with an appropriate diluent and removed from the tank 22. If the storage tank 22 contains a soil contaminated with ethylene dichloride, water may be introduced through a water line 65 to an agitation means 67, the operation of which is more specifically disclosed and described in U.S. Pat. Nos. 4,945,933 and 5,091,016, which are also incorporated herein by reference for all purposes. In the latter instance, operation of the agitation means 67 causes the ethylene dichloride present in the soil to be released into the water, and then subsequently released from the water to the surrounding atmosphere, whereupon the atmosphere within the tank 22 becomes permeated with ethylene dichloride. Thus, the soil becomes substantially cleaned and may then be withdrawn in the form of a slurry mixture having about 2 to 3 parts, by volume, of water to solids. If required, the slurry may be further treated in a solids liquid separation device, not shown, to remove residual amounts of ethylene dichloride. In such subsequent separation treatment, the vapors may be advantageously trapped and conveyed back into the storage tank 22, or introduced directly into the inlet line 24 of the scrubbing tower 30. The solids, then being substantially free of ethylene dichloride, are removable to the environment for disposal as a solid material. The liquid having minor ethylene dichloride contamination remaining is either polished by passing through a carbon canister, not shown, or transmitted to the holding tank 52 for mingling with the stream of contaminated water withdrawn from the storage tank 22.

The following example of an actual soil decontamination operation is given to better understand the construction and operation of the mobile scrubbing apparatus 20 embodying the present invention.

EXAMPLE

A fixed-roof crude oil storage tank 22, having a diameter of 110 ft, was used in this example. The tank 22 had an accumulation of about 1½ feet of soil and water contaminated with ethylene dichloride in the bottom. The atmosphere within the tank 22 was contaminated with well over 1,000 parts per million of ethylene dichloride. The mobile scrubbing apparatus 20 embodying the present invention was placed adjacent the tank 22 and the lines 24 and 42 were connected with the interior of the tank 22. The scrubbing zone 32 of the scrubbing tower 30 was packed with 3½ inch diameter hollow spherically shaped packing made of injected molded plastic (JAEGER TRI-PACS, Jaeger Products, Inc., Spring, Tex.) to a depth of 19.7 feet. The line 50 was connected to a covered portable tank 52 that was fitted with carbon pack absorption units 66 to clean any vapors escaping from the portable tank 52. The water level in the storage tank 22, containing the soil, was raised from 1 ft. 8 in. to 3 ft., with the water entering through the supply line 65 and the agitator 67, thereby causing intermixing of the water and the ethylene dichloride soil and causing the ethylene dichloride to be released from the soil and dissolved in the water. The vapor blower 26 was started and the contaminated gas atmosphere in the storage tank 22 was withdrawn and delivered to the sparger 34 in the lower end portion 44 of the scrubbing tower 30. The blower 26 raised the pressure of the gas stream delivered to the scrubbing tower 30 to about 4.5 psig. The operating pressure within the scrubbing tower 30 was about 3.5 psig. It was a hot day on the Gulf Coast with the ambient temperature being about 95° F. The compressed gas exited the blower 26 at temperature of about 124° F. The temperature of the contaminated water removed from the bottom of the scrubbing tower 30 was about 97° F. The water exiting the scrubbing tower 30, through the drain line 46 contained from about 2,000 ppm to about 2,700 ppm ethylene dichloride over a recorded 12 day operation period. The scrubbing tower effluent was diluted in the portable holding tank 52 with feed water taken from an uncontaminated source at about 200 gpm. The stream from the holding tank 52 was split, with 240 gpm being recirculated over the scrubbing zone 32 in the tower 30, and 200 gpm drawn from the tank 52 through the line 60 by the pump 62, and pumped through carbon canister filters to remove ethylene dichloride. The ethylene dichloride concentration of the withdrawn stream was approximately 1,100 ppm, having been diluted from the higher concentration of the stream withdrawn from the scrubbing tower 30 by the uncontaminated water added through the supply line 54. The recycle stream pumped to the distributor 38 in the top of the scrubber 30 also contained about 1,100 ppm ethylene dichloride. While passing down through the packing in the scrubbing zone 32, more ethylene dichloride was absorbed and the cycle thus continued. The contaminated stream from the bottom of the scrubber 30 was diluted to moderate the rate at which the carbon canister pack, through which the withdrawn stream was processed, was loaded with ethylene dichloride.

The operating pressure within the scrubbing tower 30 ranged from about 2 to about 5 psig, with the preferred range being between about 2.1 and 2.5 psig. The blower 26, in removing the hazardous gases from the tank 22, drew a steady negative pressure of 1 psig on the tank 22. The vapors passing through the scrubbing tower 30 exited the top headspace 40 of the tower 30 with an ethylene dichloride content of about 925 ppm. The exiting vapors were reintroduced into the tank 22, through return line 42, where they picked up more ethylene dichloride from the vapors in the tank 22, and were recycled again through the tower 30. Importantly, throughout the scrubbing operation, the atmosphere within the tank 22 was maintained below atmosphere and, therefore, the escape of ethylene dichloride bearing vapors through the vent and into the surrounding operation area was abated. It was noted by operating personnel in the vicinity of the tank 22 that, prior to the scrubbing operation, there had been continuing detection of ethylene dichloride in the area. Thus, in carrying out the above illustrative example, the scrubbing apparatus 20 embodying the present invention was also useful in cleaning the atmospheric environs in the vicinity of the storage tank 22.

Turning again to the description of the apparatus 20 embodying the present invention, water enters the scrubbing tower 30 through the distributor nozzles 38 located near the top of the tower 30 and is released as mentioned above. The distributor 38 evenly spreads the waste water over the entire top surface of packing which fills the scrubbing zone 32 of the tower 30. The packing may be either random or structured. The scrubbed gases are collected in the chamber, or headspace 40 at the top of the tower 30 above the distributor 38. A mist eliminator 68, preferably made of a stainless steel mesh, prevents water droplets from being carried from the scrubbing tower 30 into the atmosphere of the storage tank 22.

In the preferred embodiment of the present invention, the packing disposed in the scrubbing zone 32 of the scrubbing tower 30 are the above-described 3½ inch diameter hollow, spherical-shaped packing made of injection molded plastic. The spherical packing balls may be made from any suitable injection moldable plastic such as polypropylene, polyethylene, polypropylene glass-filled, "NORYL" (a registered trademark of General Electric Company), "TEFLON" (a registered trademark of E. I. Dupont de Nemours & Company, Inc.), or any other suitable materials. Spherical packing for the present invention may range from about ⅝ inch to about 4 inches in diameter. Other useful packing materials include metal packing (including carbon and alloy steels, aluminum, copper, and others), ceramic packing, and chemical porcelain packing. However, since the weight of mobile units for highway travel is important, the lighter, less dense materials are preferred, if not necessary. The tower 30 internal structure is also preferably formed of plastic materials to reduce the weight of the apparatus and thereby enhance the transportability of the apparatus. The internal structure of the tower 30 may be made of any other suitable material, including metal, however.

Spherical polyethylene balls having a diameter of about 3½ inch are the preferred packing material because of weight and mass transfer efficiency. The 3½ inch plastic spheres have a geometric surface area of about 38 square feet per cubic feet and have a packing density in the scrubbing zone 32 of from about 2.9 to about 3.7 pounds per cubic feet, preferably 3.3 pounds per cubic foot. With the above illustrative examples and detailed description, the skilled engineer will be able to design a scrubber 30 within the size (length and diameter), weight, and capacity requirements of this invention.

The preferred embodiment of present invention is shown in FIG. 2, a perspective view of the mobile scrubbing apparatus 20 in which the elements encompassed within the broken line area of FIG. 2 are mounted on a mobile frame, such as a flatbed trailer 70, with wheels 72. Alternatively, the mobile frame 70 may be truck mounted or skid mounted for transport to a decontamination site. The mobile frame 70 may also be mounted on a self propelled frame such as a truck. The scrubbing tower 30 is supported by a tower cradle 74 which can be lowered to a horizontal position A for transport on a cradle rest 76.

Referring now to FIG. 3, a hydraulic tilt cylinder 78 provides a means to move the scrubbing tower 30 between the horizontal transport position A and a vertical operating position B. The scrubbing tower 30 is also supported and stably maintained in the vertical operating position B by the tower cradle 74. As shown in FIGS. 3 and 4, the tower cradle 74 preferably has two longitudinal tower supports 80, six side supports 82, and two tower-end side supports 84 which cooperate to hold the scrubbing tower 30 in place in both the horizontal and vertical positions, A,B. As shown in FIG. 5, the scrubbing tower 30 is supported on its bottom side by three tower bottom supports 86, the tower-end side supports 84, and the two longitudinal tower supports 80.

The tower cradle 74 in the preferred embodiment also consists of two long frame supports 88 which are attached to the two longitudinal tower supports 80 by six frame side supports 90. The tower cradle support system 74 also has three frame bottom supports 92, as best seen in FIG. 7. As shown in FIG. 3, a diagonal brace 94 is provided between the long frame support 88 and the long tower support 80.

FIG. 6 shows a cross section of the scrubbing tower 30 and the tower cradle 74 near the bottom end of the stripping tower 30. This cross-sectional view shows the tower 30 cradled between the two longitudinal tower supports 80, the two tower-end side supports 84, and a split tower-end bottom support 96.

FIG. 7 shows a similar cross-section near the middle of the scrubbing tower 30, through the tower cradle system 74. Here, the tower 30 is cradled by the longitudinal tower supports 80, along with the two long frame supports 88, two of the frame side supports 90, and one of the frame bottom supports 92. A triangle stiffener 98 is provided for additional strength near the junction of the tower bottom support 86 and the long tower support 80.

Referring now to FIG. 8, a detailed view of the scrubbing tower 30 within the hatched circle in FIG. 7 is shown. A collar assembly 100 supports the tower 30 in conjunction with the cradle 74. An internal collar 102 is welded to the body of the scrubbing tower 30. An external collar 104, which is attached to the tower side support 82, loosely yet securely, encloses the internal collar 102 in a slidable relationship, thus holding the tower 30 within the tower cradle system 74. The internal collar 102 may move within the external collar 104 to allow for thermal expansion contraction while holding the scrubbing tower 30 securely in the vertical position.

Referring again to FIGS. 3 and 4, a pivot arm 106 is connected at one end to the hydraulic tilt cylinder 78 which is secured at the other end to the trailer 70 itself to provide a means for raising and lowering the scrubbing tower 30. The controls for operating the hydraulic tilt cylinder 78 are well known and not shown or described herein. At its other end, the pivot arm 106 is attached to the longitudinal tower support 80 at a pivot arm connection 108. At an intermediate position between the two ends, the pivot arm 106 is pivotally attached to the longitudinal frame support 88 at a pivot point 110. A cylinder connection 112 is shown at the other end of the pivot arm 106, which is the aforementioned connection with the hydraulic tilt cylinder 78.

FIG. 9 is a detailed view of the cylinder connection 112. A cheek 114, is attached to the pivot arm 106 through a hole 116 drilled through the cheek 114 and the underlying pivot arm 106. FIG. 10 shows a cross-sectional schematic view of the cylinder connection 112 of the pivot arm 106 taken along the line 10—10 of FIG. 9. A rod end 118 of the hydraulic cylinder 78 is attached to the pivot arm 106 by a bolt 120 and a nut 122. The bolt 120 crosses through the cheek 114 and the pivot arm 106 through the hole 112.

Prior to operation, the scrubbing tower 30 is moved to the vertical operating position B as shown in FIG. 3, by use of the hydraulic tilt cylinder 78 mounted to the trailer 70. A plumb line, bubble leveling device, or machinist's level, or the like, informs the operator that the scrubbing tower 26 is in the desired vertical operating position B necessary to provide uniform distribution of water through the scrubbing zone 32. Stabilizing arms and pads 124 with hydraulic operators are used to insure that the scrubbing tower 30 is properly oriented and stabilized. At the completion of the gas decontamination process, the hydraulic tilt cylinder 78 is advantageously used to reposition the scrubbing tower 30 in a horizontal transport position A.

Although the present invention is described in terms of the above preferred embodiments as a scrubbing tower, those skilled in the art will recognize that changes in the apparatus may be made without departing from the spirit of the invention, including such changes necessary to operate the apparatus as a stripper column. Such changes are intended to fall within the scope of the following claims.

What is claimed is:

1. Mobile apparatus for promoting gas/liquid mass transfer, which operates as a scrubbing tower or a stripping tower, comprising:

a mobile frame;

a tower containing a packed bed pivotally mounted on said mobile frame for movement between a horizontal transport position to a vertical operating position, said tower having an upper end portion and a lower end portion when disposed at said vertical operating position;

a means for moving said tower between said horizontal transport position and said vertical operating position;

means for maintaining said tower at said vertical operating position;

means for receiving and distributing gas upwardly through said tower when the tower is in said vertical operating position;

a blower having a discharge port in fluid communication with said means for distributing gas upwardly through the tower, and an inlet port adapted to draw in air or hazardous gas mixture;

a first pump having an inlet port in fluid communication with a bottom portion of said tower;

means for receiving and distributing water downwardly through the packing of said tower when the tower is in said vertical operating position; and a second pump having an inlet port adapted for connection with a source of water and a discharge port in fluid communication with said means for distributing water downwardly through said tower.

2. The mobile apparatus of claim 1 configured as a scrubbing tower for removing hazardous gases from an enclosed structure which further comprises:

the blower having the inlet port adapted to receive a first conduit that is connectable with an enclosed vessel containing a hazardous gas mixture;

a second conduit in fluid communication with a chamber disposed at an upper end portion of said scrubbing tower and adapted for connection with the enclosed vessel containing a hazardous gas mixture.

3. The apparatus for removing hazardous gases from an enclosed structure, as set forth in claim 2, wherein said blower is mounted on said mobile frame.

4. The apparatus for removing hazardous gases from an enclosed structure, as set forth in claim 3, wherein said first and second pump are mounted on said mobile frame.

5. The apparatus for removing hazardous gases from an enclosed structure, as set forth in claim 2, wherein said means for distributing water downwardly through said scrubbing tower when the tower is in said vertical operating position includes a water distributor positioned adjacent the upper end portion of said scrubbing tower, said water distributor being in fluid communication with said second pump connected to a source of water.

6. The apparatus for removing hazardous gases from an enclosed structure, as set forth in claim 2, wherein said scrubbing tower includes a scrubbing zone disposed between said means for distributing gas upwardly through said scrubbing tower and said means for distributing water downwardly through said tower, said scrubbing zone having a plurality spherical balls disposed therein.

7. The apparatus for removing hazardous gases from an enclosed structure, as set forth in claim 6, wherein said spherical balls are formed of a plastic material and have a diameter of from about ⅝ inch to about 4 inches.

8. The apparatus as set forth in claim 1, wherein said means for moving said tower between said horizontal transport position and said vertical operating position includes an extendable hydraulic cylinder having a first end connected to said mobile frame, and a second end attached to a pivot arm attached to said means for maintaining said tower at said vertical operating position.

9. The apparatus as set forth in claim 1, wherein said means for maintaining said tower at said vertical operating position includes a cradle structure supporting said tower, said cradle structure being stabilized by a pivot arm attached at one end to said cradle structure and at the other end to a hydraulic cylinder attached to said mobile frame.

10. The mobile apparatus as set forth in claim 1, wherein said means for distributing gas upwardly through said scrubbing tower when the tower is in said vertical position includes a sparger disposed in said lower end portion of the scrubbing tower, said sparger being in fluid communication with said blower.

11. The apparatus of claim 1, wherein the pumps are mounted on the mobile frame.

12. The apparatus of claim 1, wherein the blower is mounted on the mobile frame.

* * * * *